(12) United States Patent
Jover Segura et al.

(10) Patent No.: US 8,893,246 B2
(45) Date of Patent: Nov. 18, 2014

(54) METHOD AND SYSTEM FOR AUTHENTICATING A POINT OF ACCESS

(75) Inventors: Xavier Jover Segura, London (GB); Fadi El-Moussa, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 13/638,392

(22) PCT Filed: Mar. 30, 2011

(86) PCT No.: PCT/GB2011/000486
§ 371 (c)(1),
(2), (4) Date: Sep. 28, 2012

(87) PCT Pub. No.: WO2011/121294
PCT Pub. Date: Oct. 6, 2011

(65) Prior Publication Data
US 2013/0019298 A1    Jan. 17, 2013

(30) Foreign Application Priority Data
Mar. 30, 2010 (EP) .................... 10250655

(51) Int. Cl.
*H04L 29/06* (2006.01)
*H04W 12/08* (2009.01)

(52) U.S. Cl.
CPC .......... *H04L 63/1441* (2013.01); *H04L 63/101* (2013.01); *H04L 63/18* (2013.01); *H04W 12/08* (2013.01); *H04L 63/1466* (2013.01)
USPC .................... 726/7; 455/411; 726/3; 713/168; 713/170

(58) Field of Classification Search
USPC .................... 455/410, 411; 380/270, 258–260
See application file for complete search history.

(56) References Cited

U.S. PATENT DOCUMENTS

| 2004/0023640 A1 | 2/2004 | Ballai |
| 2004/0198220 A1 | 10/2004 | Whelan et al. |

(Continued)

FOREIGN PATENT DOCUMENTS

| EP | 1 542 406 | 6/2005 |
| EP | 1 891 791 | 10/2009 |

(Continued)

OTHER PUBLICATIONS

U. Blumenthal and B. Wijnen, "User-based Security Model (USM) for version 3 of the Simple Network Management Protocol (SNMPv3)," IETF, RFC 3414, Dec. 2002.*
Subir Das, Yoshihiro Ohba, Farooq Bari, "Information Service (IS) Reference Model, Use Case Scenario and higher Layer requirements for 802.21 Information Service (IS)," Sep. 2005.*

(Continued)

*Primary Examiner* — Tae Kim
*Assistant Examiner* — Louis Teng
(74) *Attorney, Agent, or Firm* — Nixon & Vanderhye PC

(57) ABSTRACT

Rogue or malicious access points pose a threat to wireless networks (32) and the users of these networks. In order to prevent or reduce this threat a method and system is proposed that verifies that an access point (31) is genuine and not rogue before setting up a connection between the access point and a wireless device (34). The authentication is based on comparing an identifier of the wireless device (34) obtained from an authentication server (33, 35) in the wired network to an identifier of a wireless device obtained directly from the wireless device. A comparator (39) in an information server (36) receives the two sets of data and compares the two identifiers and if they match the access point is verified as genuine.

14 Claims, 8 Drawing Sheets

(56) References Cited

U.S. PATENT DOCUMENTS

| | | | |
|---|---|---|---|
| 2007/0082654 | A1 | 4/2007 | Hovnanian et al. |
| 2007/0180499 | A1 | 8/2007 | Van Bemmel |
| 2007/0183375 | A1 | 8/2007 | Tiwari |
| 2008/0151844 | A1 | 6/2008 | Tiwari |
| 2008/0201765 | A1* | 8/2008 | Walter et al. ............ 726/3 |
| 2008/0301773 | A1* | 12/2008 | Achtari et al. ............ 726/3 |
| 2009/0022152 | A1 | 1/2009 | Henry et al. |
| 2009/0067623 | A1 | 3/2009 | Lei et al. |
| 2009/0135758 | A1 | 5/2009 | Alper et al. |

FOREIGN PATENT DOCUMENTS

| | | |
|---|---|---|
| WO | 2008/095291 | 8/2008 |
| WO | 2009/025707 | 2/2009 |

OTHER PUBLICATIONS

International Search Report for PCT/GB2011/000486, mailed Jul. 1, 2011.

Ma et al., "A Hybrid Rogue Access Point Protection Framework for Commodity Wi-Fi Networks", Department of Computer Science, The George Washington University, Washington DC, USA, IEEE 2008 (9 pgs.).

Srilasak et al., "Integrated Wireless Rogue Access Point Detection and Counterattack System", Thai Computer Emergency Response Team (ThaiCERT), National Electronics and Computer Technology Center (NECTEC), Pathumthanee, Thailand and Intelligent Wireless Network Group (IWING), Department of Computer Engineering, Kasetsart University, Bangkok, Thailand, 2008 International Conference on Information Security and Assurance (6 pgs.).

* cited by examiner

METHOD AND SYSTEM FOR AUTHENTICATING A POINT OF ACCESS

This application is the U.S. national phase of International Application No. PCT/GB2011/000486, filed 30 Mar. 2011, which designated the U.S. and claims priority to EP Application No. 10250655.7, filed 30 Mar. 2010, the entire contents of each of which are hereby incorporated by reference.

TECHNICAL FIELD

The present invention relates to security in wireless networks and particularly to a method and system for authenticating an access point to a wireless device.

BACKGROUND

Access points and base stations (sometimes generally referred to points of attachment) provide a gateway between a wireless network and a wired network. Wireless networks have an inherent security risk in that the signals transmitted in a wireless network can be received by any wireless device within range of the transmitter. The popular IEEE 802.11 wireless networking standard combats this by including security mechanisms known as Wired Equivalent Privacy (WEP) and Wi-Fi Protected Access, (WPA and WPA2). WEP and WPA provide rudimentary authentication and data encryption for wireless clients. Beyond WEP and WPA, many vendors implement firewalls and MAC address filtering in an attempt to protect the internal network infrastructure and wireless clients.

What is often overlooked in wireless network security is the threat posed by rogue access points (AP).

The AP impersonation attack was originally developed to trick unsuspecting clients to connect to an attacker controlled wireless network. This can be achieved by establishing a rogue access point with the same SSID (Service Set Identifier) as the target network. For example, an attacker could impersonate a wireless network by broadcasting the SSID of that specific wireless network with high signal strength to provide best connectivity. Wireless devices scan for their favourite wireless network SSID and associate to the access point offering the strongest signal. An attacker can configure an access point to respond to client requests and, ultimately trick the client into connecting to its access point. The attacker can then monitor, control, or modify any of the traffic sent to and from the client.

For example the attacker can then serve them a Web page asking for the user to re-enter their credentials, give them an IP address and then pass them on to the Internet. The user of the wireless device may remain unaware that the attack has occurred.

A method for dealing with rogue access points is described in the patent application WO2008/095291. In some embodiments the combination of a wireless network's SSID and the AP's MAC address (Media Access Control address) is verified when a wireless device first connects to an access point. The administrator of the WLAN provides registration information regarding itself, including the desired SSIDs to a central server. The central server receives the registration information and connects with a database registry containing all registered SSIDs. A check is performed to ensure that the desired SSID has not already been registered. If the desired SSID has not been registered, the central server creates an association between the SSID and each AP MAC address of the WLAN. This association is stored in the database registry. The central server then transmits the registration information to a certificate authority. The certificate authority performs validation of the registration information and if the validation passes, the certificate authority issues for each access point within the WLAN digital certificates associating the AP MAC address with the SSID of WLAN. Such a digital certificate is transmitted to each access point of the WLAN.

Once the wireless device is connected to the access point of the WLAN, the access point of the WLAN transmits the digital certificate to the wireless device. The wireless device connects to the central server through the access point and submits the certificate and SSID to the central server. The central server authenticates the digital certificate and verifies that the purported network identifier is indeed associated with the WLAN to which the AP with this MAC address belongs. This ensures that the WLAN to which the wireless device is connecting to is the one to which the wireless device is intending to connect.

The known method remains vulnerable to a so-called man-in-the middle-attack; the certificate can be sniffed and copied and used by rogue access points. The application suggests the use of traceroute information to prevent sniffing; however, tracerouting is not suitable in an IP network since packets can be routed over many different routes between the same end-points and further, nothing prevents a rogue access point from spoofing also the traceroute packets.

US20040198220 discloses another system for securely accessing a wireless network. The system includes a security server that subscribes to messages from an SNMP trap on the access point. When a mobile unit associates with that access point, the trap sends a message indicating the association information. A roaming control client on the mobile device polls the security server, which verifies (or not) that it has received the message for that association.

A disadvantage with this system is that since the wireless device polls the security server via the unauthenticated access point it is likely that the device will have exchanged several messages, likely including sensitive data, with a possibly rogue access point before even realising that it is a fake access point.

EP1542406 discloses an impersonation detection system for a wireless node. The node comprises an intrusion detection module for correlating original data frames, transmitted directly by the wireless node over a secure link to the intrusion detection module, with incoming data frames received over the air interface. If the wireless node is inactive but the intrusion detection module receives traffic that indicates that the monitored node is the originator, then this would be a sign of suspect behaviour since correlation of the data sets would not result in an empty data set.

This is a fairly complicated system in which the intrusion detection module constantly has to monitor the channels allocated to the node using an antenna in order to compare frames. Another disadvantage is that the wireless node has to be connected to the intrusion detection module over the secure link and if this link fails for some reason the system does not work. It is also a disadvantage that the node needs to have two connections running most of the time.

SUMMARY OF INVENTION

According to a first aspect of the present invention there is provided a method of detecting the intervention of a rogue point of access in a communication between a wireless device and a wired network reachable via a genuine point of access, said method comprising:

operating said wired network to provide to a comparator, data indicative of a wireless interface identifier of the wireless device presented to it in said communication;

operating said wireless device to provide to said comparator, data indicative of the wireless interface identifier of the wireless device; and operating said comparator to compare the two sets of data, and to signal the result of said comparison to said wireless device.

This has the advantage that a user will not be tricked into associating with a malicious device pretending to be a genuine point of access since the comparator will reveal that the communication between the wireless device and the wired network has been intercepted and forwarded by a malicious device to the wired network since the indicative data received from the wired network and the indicative data received directly from the wireless device will differ.

Preferably, the wired network is operated to further provide to the comparator data indicative of an identifier of the point of access used in the communication between the wireless device and the wired network and the comparator is further operated to compare the data indicative of an identifier of the point of access to identifiers of known points of access previously stored at the comparator.

This further ensures that the wireless device has associated with a genuine point of access that belongs to a specific network provider that has registered its points of access with the comparator.

Preferably, said comparator is accessible to said wireless device via a second wireless interface of said wireless device, and said wireless device sends data indicative of its first wireless interface identifier to said comparator via the second wireless interface.

Sending the data via a second wireless interface increases the possibility to detect that a rogue access point has intercepted the communication since it is unlikely that the rogue access point would be able to intervene in two wireless communication channels.

Preferably, the comparator is co-located with an information server, which supports handover of said wireless device between wireless heterogeneous networks.

This has the advantage that data stored by the information server in order to support heterogeneous handover can be used by the comparator. Further, the information server is centrally located and can be shared between many network providers and wireless devices, hence the computational burden of comparison can be shared and it is easier to implement the invention.

Preferably, the indicative data is processed in the wired network in a manner which provides assurance to the comparator that the indicative data was generated by the wired network and has not been altered since.

By processing the indicative data, by for example signing or encrypting the data with a private key of the network provider, spoofing of the indicative data is prevented.

Preferably, encrypted user log-in credential is forwarded to the wireless device from the comparator when the comparator server has verified that the point of access is genuine. This has the advantage that the user does not need to remember his user credentials for each network and the further advantage that since the credentials are encrypted, and sent directly from the wireless device to the log-in server; users are prevented from sharing credentials.

BRIEF DESCRIPTION OF DRAWINGS

There now follows, by way of example only, a description of preferred embodiments of the present invention. This description is given with reference to the accompanying drawings, in which.

DETAILED DESCRIPTION

Figure 1:
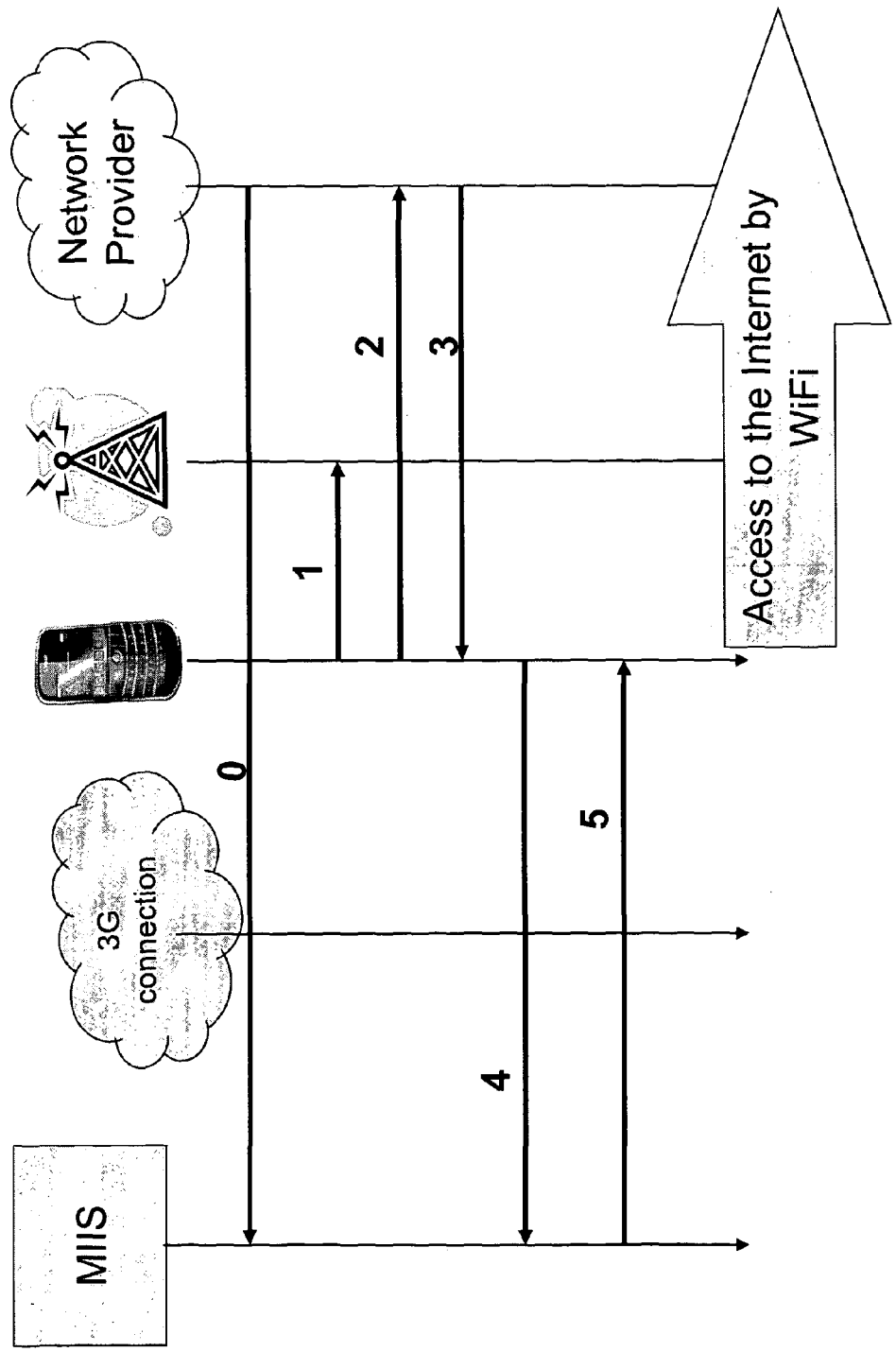
FIG. 1 shows a message flow diagram for a first embodiment of the invention.

The embodiments described here are implemented in a network operating in accordance with IEEE 802.21.

The IEEE 802.21 standard supports algorithms enabling seamless handover between networks of the same type as well as handover between different network types also called Media independent handover (MIH) or vertical handover. The standard provides information to allow handing over to and from cellular, GSM, GPRS, WiFi, Bluetooth, 802.11 and 802.16 networks through different handover mechanisms.

The key functionality provided by MIH is communication among the various wireless layers and between them and the IP layer. The required messages are relayed by the Media Independent Handover Function, MIHF, which is located in the protocol stack between the layer 2 wireless technologies and IP at layer 3.

Three different services are defined within the 802.21 standard:

The Media Independent Event service (MIES) is implemented in mobile devices and enables them to receive notifications such as Link going down, link up, and signal strength.

The Media Independent Command Service (MICS) is also implemented in mobile devices and enables them to control the radios in order to turn them on and off.

The Media Independent Information Service (MIIS) is situated in the network and allows users to request information about surrounding networks.

The MIES and MICS in the mobile device together form a connection manager.

The MIIS holds information about networks and access points. An access point, or point of access, can be for example a WLAN access point or a base station in a cellular or 3G network. Some examples of what this information could be are: operator name, cost per minute, cost per hour, bandwidth, access point MAC address, channel and location of the access point. Each of these fields is called an Information Element (IE) and the standard defines some of them but allows the use of extended ones.

The main feature of MIH is that devices can obtain information about surrounding networks without having the specific radio interfaces switched on. For example a device with 3G, WiFI and WiMAX radios, or interfaces, could have only the 3G radio switched on, and still know if there are WiFI or WiMAX access points in the neighbourhood by asking the MIIS through the 3G interface, saving in unfruitful scanning and allowing the device to have only one interface on at all time.

The media independent handover is achieved with the help of the MIIS and MICS. The device requests information from the MIIS about surrounding networks and the MIIS replies with the networks available for the radio interfaces of that specific device. The MICS then uses the information provided by the MIIS to decide which network to hand over to. It turns on that radio interface and directly connects to the chosen access point, which can be for example a WLAN access point or a base station in a 3G network. When this is done the connection manager can transfer or trigger to transfer running applications to the new access point, using the newly switched on interface, and when all the data is going through the new interface the old interface is switched off for battery saving.

The user of a wireless device implementing the preferred embodiments described below has decided to use a service provided by for example a network provider. In order to implement the method the user downloads a software program offered by the network provider to the wireless device. The software program can for example be downloaded from a network provider's website or installed from a portable memory or DVD-ROM. After installing the program the connection manager in the device is configured to perform, in addition to the normal steps for accessing a network provider over a wireless network, the further steps described in the different embodiments below and in the flow chart in FIG. 5.

Figure 5:
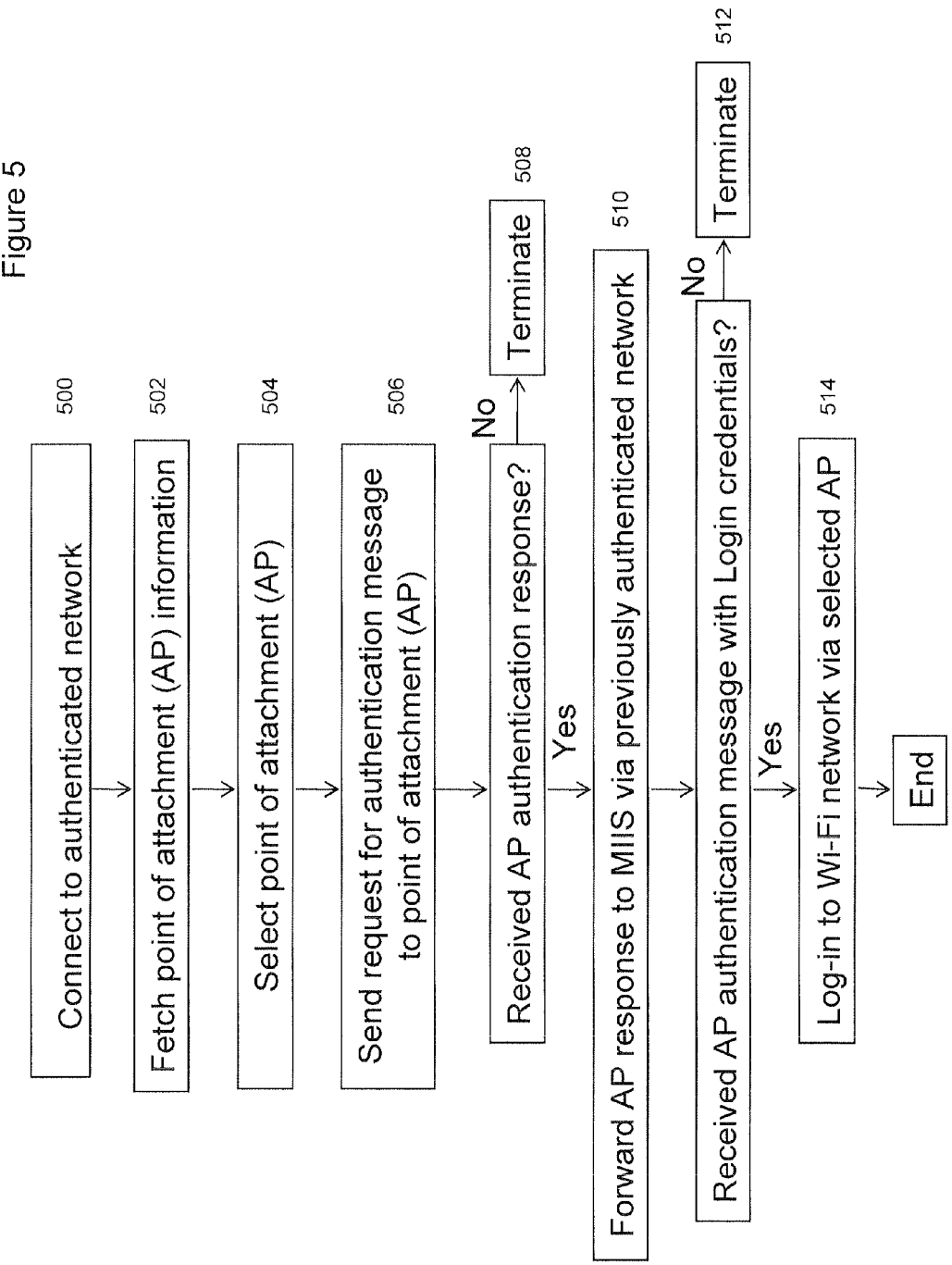
FIG. 5 shows a flow chart for a mobile device requesting an authentication of an access point

Referring to FIG. 5 the device first connects to or uses an already authenticated network [500] in order to fetch information from an information server regarding available networks and access points in the area [502] and then selects one of the access points [504]. The wireless device sends a request for an authentication message to the network provider via the selected access point [506]. If it does not receive an authentication response the connection manager terminates the connection [508]; otherwise it forwards the authentication response to an information server, or MIIS, via a communications channel in the previously authenticated network [510]. The wireless device then either receives a message that the access point is authenticated, in which case it logs-in to the network via said access point [514], or it receives a message that the access point is not authenticated or it does not receive a message at all, in which cases the connection manager terminates the session [512].

The network provider has further installed software in the access points of the network as well as software in an NP controller, which is a server in the network that manages the access points in the network. The controller is configured by the software program to generate authentication messages and will therefore also be called an "authentication message server". Hence, the access points and the NP controller are configured to perform the steps described in the following embodiments and in the flow charts of FIGS. 6 and 7 respectively.

Figure 6:
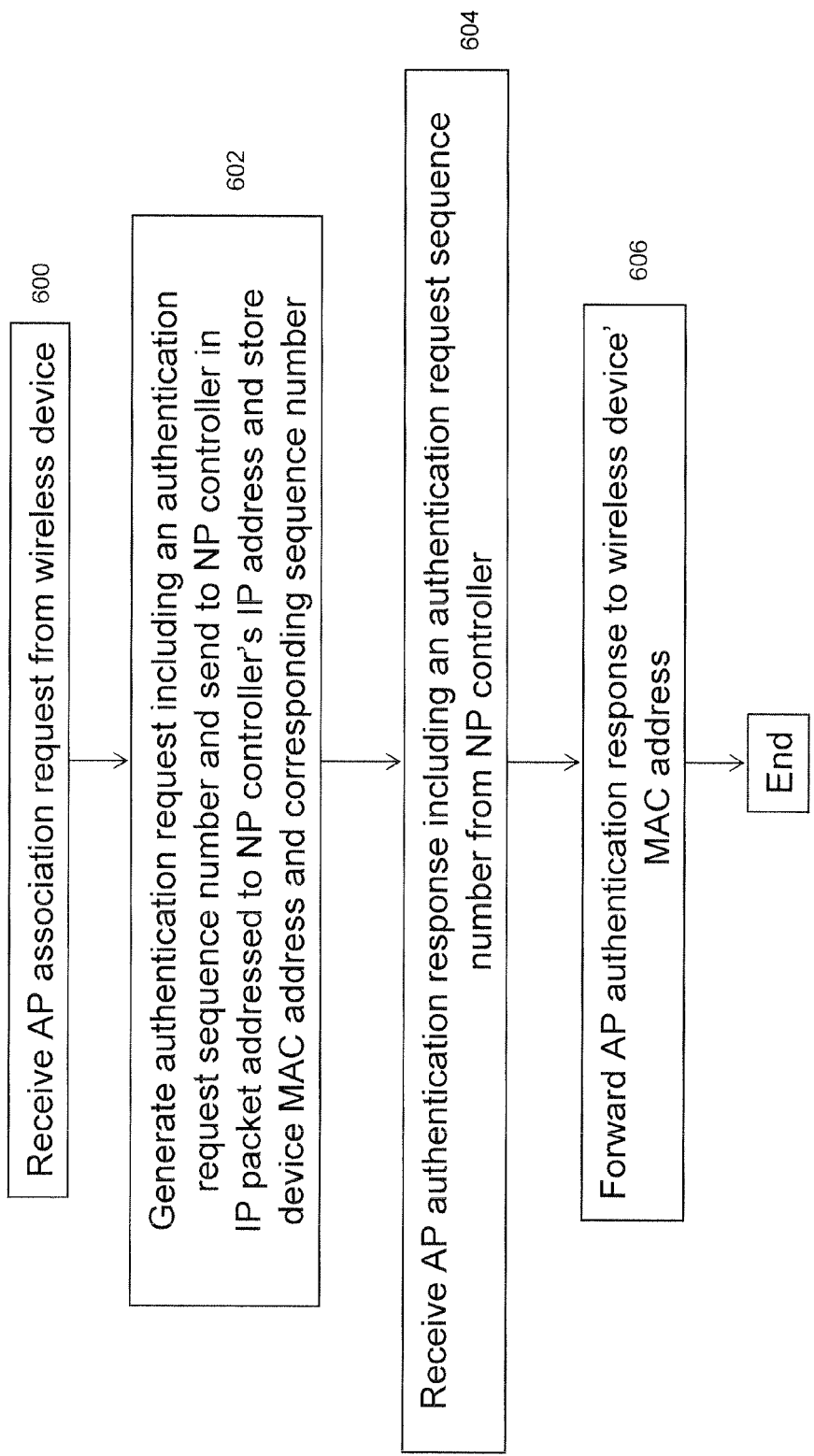
FIG. 6 shows a flow chart for an access point to be authenticated

Referring to FIG. 6 the selected access point receives an association request from a wireless device [600]. The access point generates an authentication request including an authentication request sequence number and sends the request to the NP controller in the wired network of the network provider and stores device MAC address, i.e. the MAC address of the device's WiFi network interface card, and corresponding sequence number [602]. It then receives an authentication response or message including an authentication request sequence number from the NP controller [604], which the access point sends to the wireless device using the MAC address originally submitted by the wireless device when sending the request.

Figure 7:
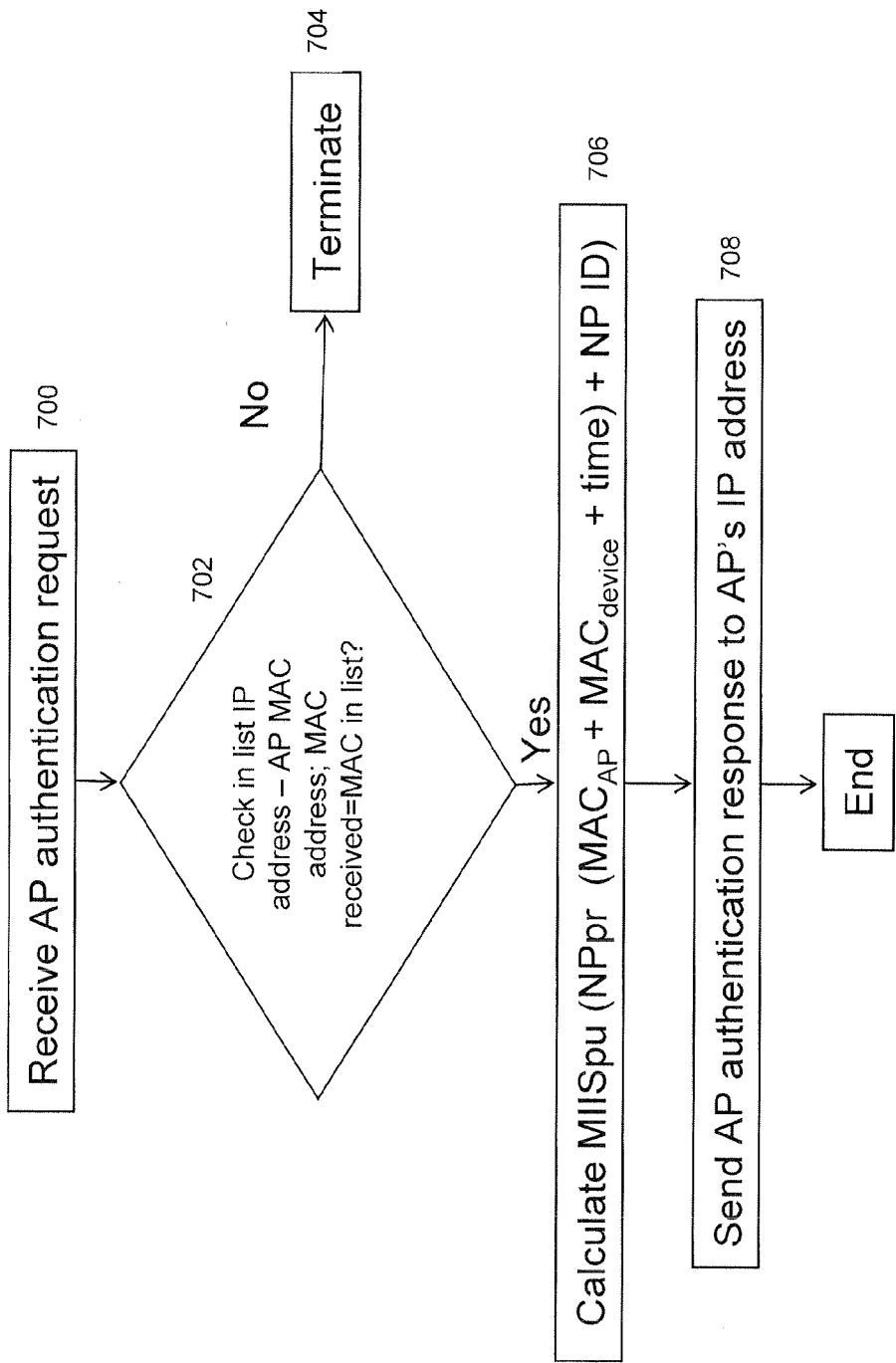
FIG. 7 shows a flow chart for a network provider controller

Referring to FIG. 7, the server or controller in the wired network receives an access point authentication request from the access point [700]. The server checks in a stored list that stores IP addresses and MAC addresses for the access points in the wired network that IP address is in the list, and checks that the stored MAC address corresponds to the MAC address of the access point that delivered the authentication message [702]. If the MAC addresses do not correspond the server terminates the process and does not create an authentication message [704]. Otherwise, it creates the authentication message by processing, for example a digital signature algorithm, an identifier, such as MAC address, of the wireless device that sent the request for an authentication message and optionally it also processes the MAC address for the access point and the time in the same way [706]. The server then sends the authentication message to the access point using the IP address of the access point, over the wired network [708].

As part of the access point authentication service the information server, MIIS, will be configured by an installed software program to act as a comparator or verification server for determining if an access point is genuine or a rogue or malicious access point. The steps performed by the information server are described in the flowchart of FIG. 8.

Figure 8:
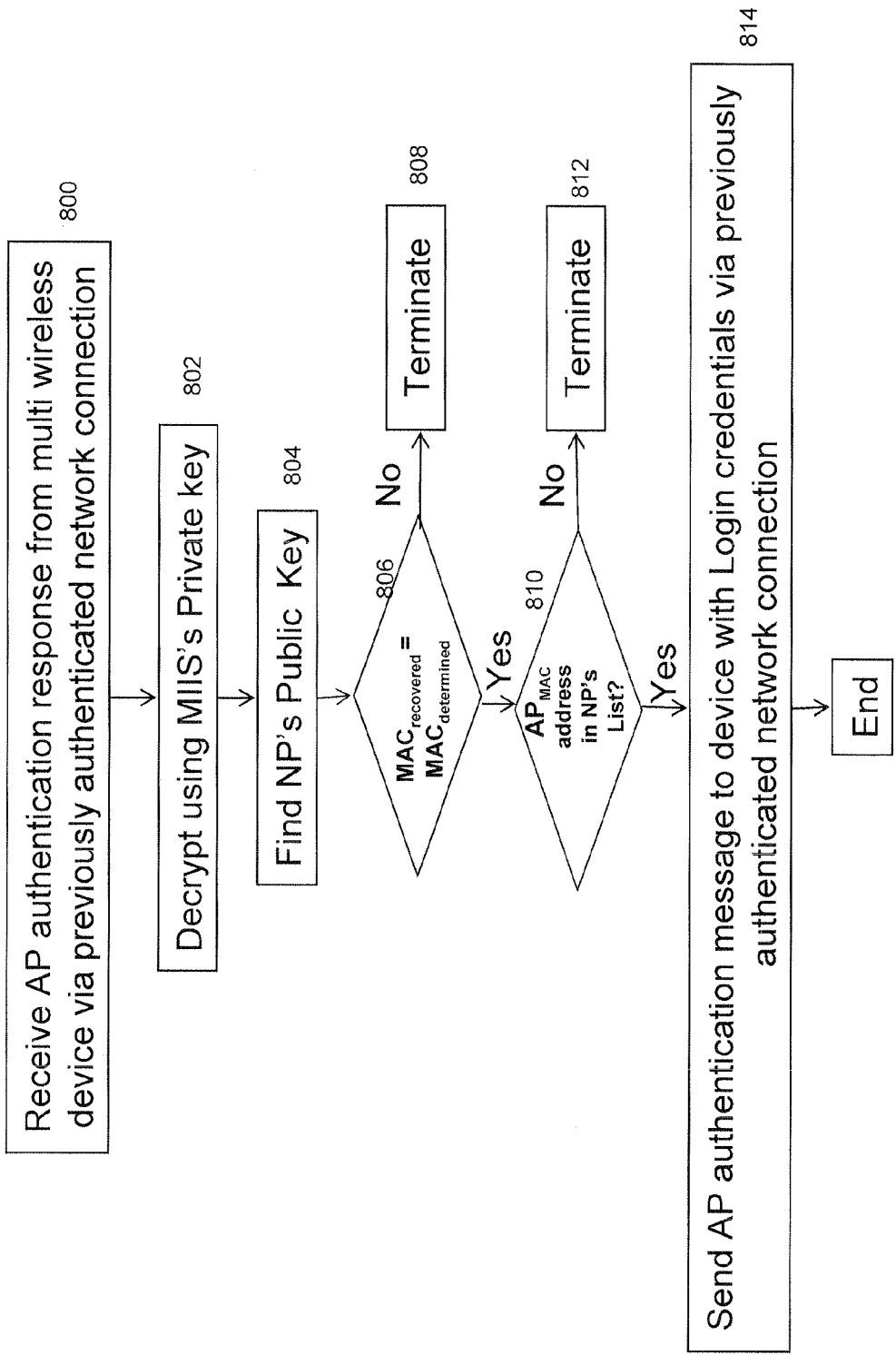
FIG. 8 shows a flowchart for an information server or MIIS participating in the access point authentication process

Referring to FIG. 8 the information server, or MIIS, receives an access point authentication message from a wireless device over an already authenticated network, such as GSM, 3G or an already authenticated WiFi connection [800]. The MIIS checks the digital signature with its private key, if key encryption is used [802], and then decrypts the message with the public key of the network provider that the access point to be authenticated belongs to [804]. The MIIS then compares the recovered, or decrypted, MAC address of the wireless device to the MAC address of the wireless device that forwarded the authentication message to the MIIS [806]. If they do not match the MIIS terminates the session [808]. If they match the MIIS optionally compares the recovered MAC address of the access point with MAC addresses of access points belonging to said network provider stored in a list in the MIIS [810]. If the access point MAC address is not in the list the MIIS terminates the session [812] or alternatively it sends a message that the access point is not authenticated. If the addresses match the MIIS will send a message to the device that the access point is authenticated and optionally it also sends log-in credentials to the device [814].

A first embodiment will now be described in relation to FIG. 1. The numbers in the figure relate to the steps described below.

A user having a wireless device wants to access the Internet and therefore triggers his device to scan for available networks in the surroundings. The user of the mobile device could alternatively connect to the information server and request a list of available networks and access points in the area. The authentication process of an access point is as follows:

1. The wireless device selects an access point.

2. The connection manager in the wireless device connects to the access point and requests, as instructed by the installed security program, an authentication message from the network provider (NP). The request incorporates an identifier for the wireless device sending the request. Preferably, the current IEEE 0.11 association request is used also as the request for an authentication message. 802.11 is the Wifi standard so this is a packet that has to be sent anyway, and already contains the AP MAC address and the MAC address for the device, which can be used as identifier for the wireless device. This packet is then encapsulated in an IP packet by the access point and sent directly to an NP controller.

3. Upon receiving the request the NP controller will reply with the authentication message, which the controller is configured to create by the installed program.

$$((MAC_{device}+time+NP\ ID)$$

The authentication message consists of the following:

MAC of the wireless device and the time of request and preferably an identifier of the network provider. The message is then encrypted by the NP controller; for example it could be encrypted with the MIIS public key shared with the network provider, however any suitable encryption method can be used After the message is created it is sent as an add on in the 802.11 association response to the access point, which is programmed to forward the message to the wireless device.

4. The connection manager in the wireless device will acknowledge the response and, as programmed, send the authentication message to the information server, or MIIS according to IEEE 802.21, for authentication preferably using a previously authenticated network such as 3G. The MIIS is configured by the installed software program to decrypt the received message; if public/private key encryption is used it will use its private key to decrypt the message. Once the MIIS has decrypted the message it will validate the message time and compare the wireless device's MAC address to a corresponding identifier for the wireless device that forwarded the authentication message to the authentication server. If, for example the authentication message is forwarded on an already authenticated Wi-Fi network the MAC address of the device sending the message can be obtained from the 802.11 header. If a 3G network is used another identifier, for example the telephone number, SIM or IMEI for the device can be extracted and the MAC address for the device can be looked up in a database in the server, which database stores for example, phone numbers and corresponding MAC addresses for devices registered for the authentication service.

5. The MIIS sends a message to the connection manager in the wireless device informing the device, i.e. its user, that the access point is genuine or rogue. If the access point is genuine the message preferably includes the user's login credentials for the selected network provider.

Thereafter, the wireless device can connect to the Internet via the authenticated access point of the network provider.

It will be seen how, in this first embodiment, the MIIS provides a convenient location for comparing $MAC_{DEVICE}$ provided in the message from the network controller with the MAC which the device indicates via the previously authenticated network. The wireless device will often already have an authenticated connection to the MIIS, and the MIIS might also have pre-existing data about wired networks to which the wireless device might be trying to connect (e.g. a shared secret key for encryption).

Figure 2:
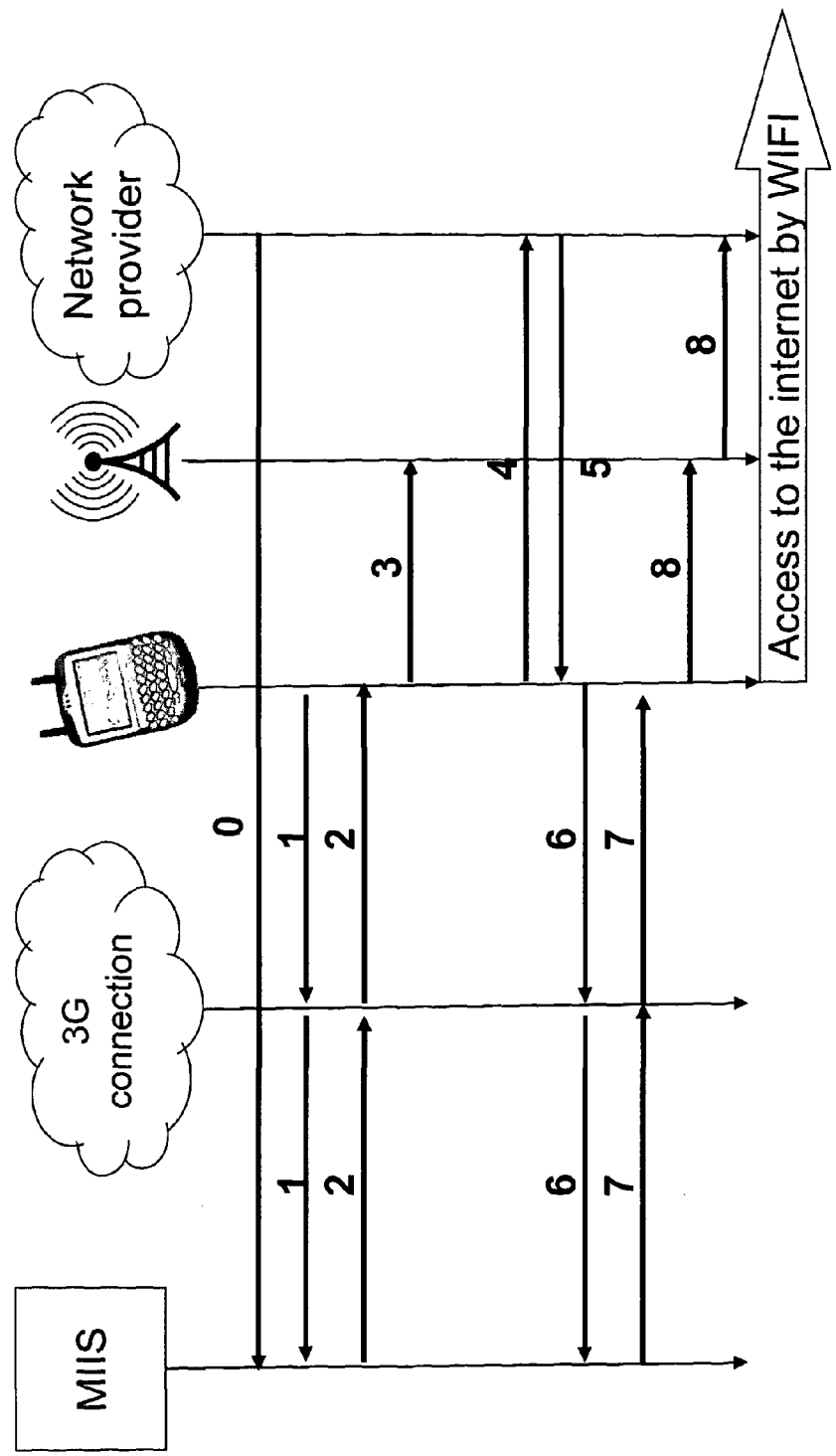
FIG. 2 shows a message flow diagram for a second embodiment of the invention.

A second embodiment will now be described with reference to FIG. 2. The second embodiment differs from the first embodiment in that the wireless device uses the information server in order to obtain information about available networks in the area and the identity of the access point is also verified by the information server. The numbers in the figure relate to steps described below.

A user with a mobile device wants to access the Internet. The mobile device first uses the 3G or GPRS to register with the MIIS and request neighbourhood information to learn if there is a suitable access point available nearby. Therefore, every network provider that would like to implement this service registers with the local MIIS and provides all the AP MAC addresses and SSIDs, public key, and credentials for login to the network; this registration process is numbered as step 0 in FIG. 2. The MIIS stores the information in a database.

The wireless device authentication process is:

1. Client use 3G or GPRS to register with the MIIS and request for neighbouring networks.

2. The MIIS will reply to the connection manager on the wireless device with a list of the known APs surrounding the user. This reply contains information about the AP such as SSID, MAC address, Network provider, Cost, Bandwidth, etc.

3. With this information the connection manager can choose which AP to connect to based on the user's requirements.

4. Thereafter, the connection manager at the wireless device will connect to the selected access point and as configured by the installed software program request an authentication message from the network provider (NP). Preferably, the current 802.11 association request is used also as the request for a authentication message. 802.11 is the Wifi standard so this is a packet that has to be sent anyway, and already contains the device and the AP MAC addresses. This packet is then encapsulated in an IP packet by the access point and sent directly to the NP controller.

5. Upon receiving the request the NP controller is configured to create the following authentication message, which is sent as an add on in the 802.11 association response to the access point which then forwards the message to the wireless device:

$$MIISpu(NPpr(MAC_{AP}+MAC_{device}+time)+NP\ ID)$$

The authentication message consists of the following:

MAC of the AP, MAC of the wireless device requesting access to the Internet and the time of request all encrypted with the network provider (NP) private key (the MIIS has the NP public key already stored). Encrypting with the private key serves as a signature. Various signature algorithms could be used (e.g. DSA (Digital Signature Algorithm), or where symmetric encryption is used between the NP controller and the MIIS; Message Authentication could be used. In either case, encryption of the signature is not required to assure the authenticity and integrity of the message on arrival at the MIIS.

In this embodiment, the entire previous message is further encrypted with the MIIS public key shared with the network provider.

6. The connection manager will acknowledge the response and is configured by the software program to send the authentication message to the MIIS for authentication using a previously authenticated network such as 3G. The MIIS will decrypt the received message using its private key, and then read the NP ID to locate the appropriate public key to decrypt the rest of the message ($MAC_{AP}+MAC_{device}+time$). Once the MIIS decrypts the message using the NP public key, then it will validate the message time and compare the decrypted MAC address of the access point to stored access point MAC addresses in the database, as well as comparing the decrypted MAC address of the wireless device with the MAC address of the device that forwarded the authentication message to the information server to make sure that the access point as well as the wireless device forwarding the message are genuine and not rogue. If, for example the authentication message is forwarded on an already authenticated Wi-Fi network, instead of a 3G network, the MAC address of the device sending the message can be obtained from the 802.11 header. If a 3G network is used another identifier, for example the telephone number for the device, can be extracted and the MAC address for the device can be looked up in database in the server, which database stores phone numbers and corresponding MAC addresses for devices registered for the authentication service.

7. If the MIIS verifies the authentication message, it is configured to send the login credentials to the connection manager at the wireless device.

8. The connection manager will use the login credentials to access the network of the network provider via the selected and authenticated access point. Hence, a user does not need to remember his credentials for each network provider but can login automatically to the selected network knowing that the access point is authenticated and thus be sure he is not connecting to a rogue access point. All the login credentials are encrypted and unavailable to the user; only the connection manager in the device is able to decrypt the login credentials thus preventing users from sharing credentials.

A third embodiment will now be described with reference to FIG. 3.

The difference between this embodiment and the second embodiment is that the access point requires a WEP/WPA key authentication in order for the wireless device to first authenticate to the access point, before authenticating to the network provider. The third embodiment operates identically to the second embodiment, save for the MIIS' reply in step 2 also providing the AP's encrypted WEP/WPA Authentication Key and in step 4 the connection manager sending the appropriate WEP/WPA key to the AP for authentication.

Once authenticated, the connection manager in the wireless device will request, step 5, an authentication message from the network provider (NP) in the same way as described in the second embodiment.

Figure 3:
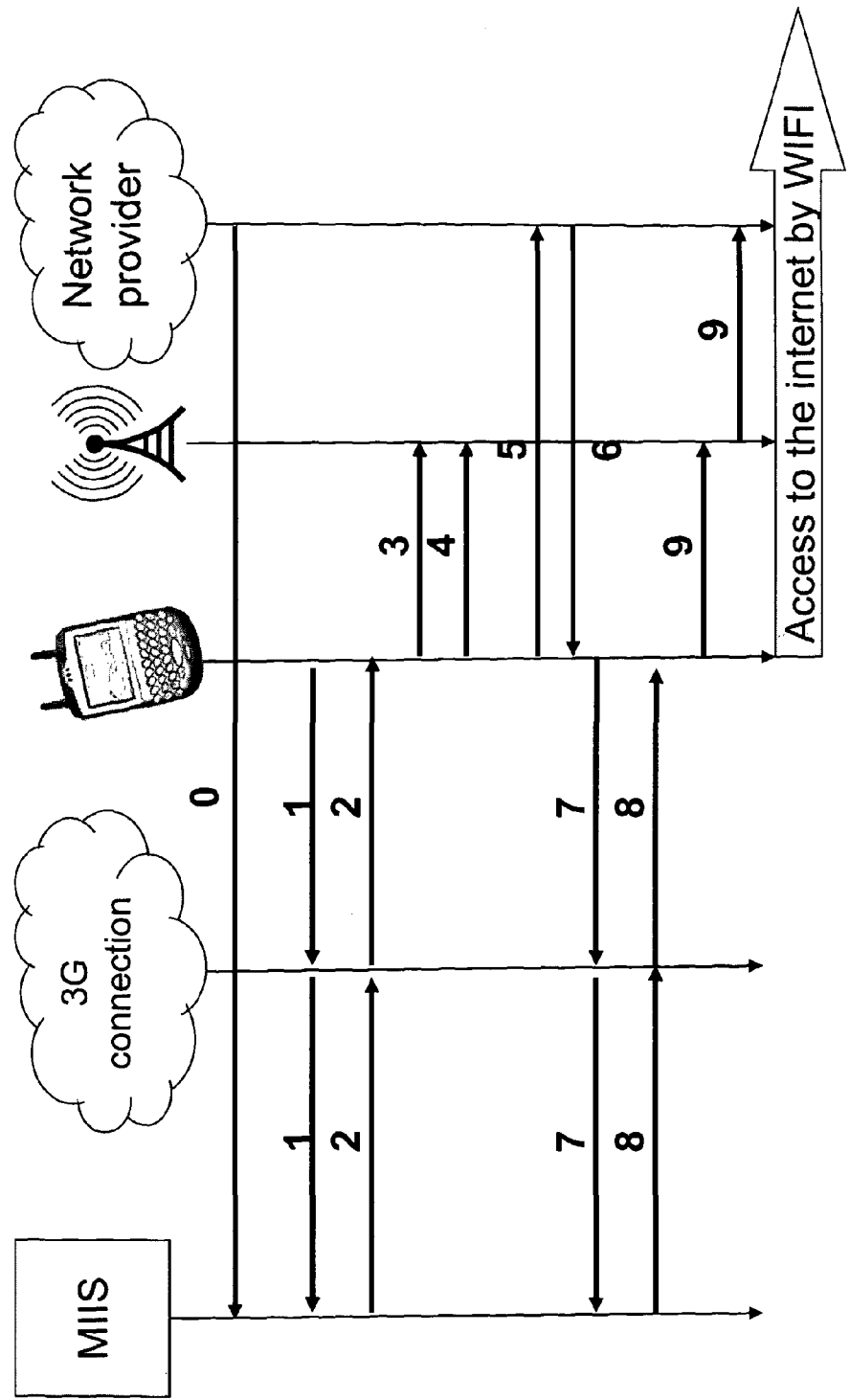
FIG. 3 shows a message flow diagram for a third embodiment of the invention.

Steps 6-9 in FIG. 3 correspond to the steps 5-8 in the second embodiment and the device will follow these steps to authenticate to the network provider and access the Internet.

The described embodiments provide several security measures that will improve the security in wireless networks.

As a first security measure, by incorporating the MAC address of the wireless device requesting the authentication message in the encrypted authentication message, the MIIS, or other interface identifier comparison means, will be able to compare that MAC address with the MAC address received directly from the device; to detect that a rogue wireless device or a rogue AP has sniffed and captured either the request for an authentication message from a wireless device or the encrypted authentication message and replayed it to the MIIS in order to authenticate itself to the network provider. Since the MAC address of this rogue device will not be the same as the MAC address of the wireless device that initially sent the request for an authentication message, the information server will realise, when comparing the MAC addresses, that something is wrong and either not verify the access point or the wireless device and hence not provide any message that the access point is genuine and/or not provide login credentials to the device.

Two different scenarios will now be described to show how this works.

In the first example a user A (who has installed the program on his mobile device as well as provided details such as mobile telephone number and corresponding MAC address for this mobile device for storage in the information server) sits in a coffee shop and triggers his wireless device A to send a request for an authentication message to a genuine access point in the coffee shop. The request includes the MAC address for the device A and hence the NP controller will include this MAC address in the encrypted message and send it back to the connection manager in device A. The connection manager forwards the encrypted message to the information server using a 3G connection.

The information server will decrypt the message and find the MAC address for the device A. By looking up the telephone number of device A (which sent the message to the information server) in the stored database the information server will find the MAC address for device A. Since the MAC addresses match, the information server will send a message including user login credentials to the device A.

In the second example the user of device A sends a request for an authentication message to what he thinks is a genuine access point in the coffee shop, however, this is instead device B (laptop for example) which transmits with high signal strength a spoofed SSID. The request for an authentication message from device A is captured by device B and device B forwards the request to the genuine access point. However, the device MAC sent to the genuine access point will be the MAC address of device B and therefore the NP controller will digitally sign device MAC address B in the authentication message and send the message back to device B. The connection manager in the malicious device B will send this message to the connection manager of device A, which will then forward the authentication message to the information server over a 3G connection. The information server will decrypt the message and find MAC address B. The information server will also look up the telephone number for device A, which forwarded the request to the information server, in the stored database and find MAC address A. By comparing the two MAC addresses the information server will see that they do not match and will therefore send a message to device A that the access point cannot be authenticated and hence not send the user log-in credentials to user A.

If device B instead of forwarding the encrypted authentication message to device A itself forwards the authentication message to the information server, the information server will look up the telephone number received from device B. Since B has probably not registered for this access point authentication service the information server will not find a corresponding MAC address and hence will not be able to compare the two MAC addresses.

If device B has registered for the access point authentication service everything will look fine, however, the information server will send a message to device B with the log-in credentials for user B and hence user B will not be able to obtain the credential for user A and user A will not be able to connect to the network provider even if the user receives a message forwarded by device B that the access point is genuine since the user login credentials are wrong.

As a second security measure, if an impersonating access point, that has spoofed the MAC address or IP address of a genuine AP, managed to physically connect to the network provider's network and manage to forward a request for an authentication message it would anyway not receive the authentication message from the network provider because the message would be routed via a routing mechanism (e.g. a router) over a wired connection to the legitimate access point having the spoofed IP address. Hence, the rogue access point cannot forward an authentication message to the wireless device and the wireless device will have to find another, legitimate, access point in order to connect to a desired network. The genuine access point which receives the authentication message will discard the packet since the wireless device is not connected to this AP.

As a third security measure, the information server checks that the decrypted identifier of an access point corresponds to an access point identifier stored in the information server, and thus belongs to a registered network provider and if not, the wireless device will be informed that the access point is not authenticated.

As a fourth security measure, by also incorporating the time in the authentication message a malicious user is prevented from sending the authentication message even when his credentials have expired. It is however not necessary to incorporate the time in the authentication message in order to verify that an access point is genuine but it is advantageous since it further increases the possibility to detect rogue or less trustable wireless devices.

As a fifth security measure the authentication message is forwarded from the wireless device to the information server over an already authenticated network, such as GSM or GPRS, so there is no risk of a rogue access point forwarding the request to a fake or spoofed information server.

Steps 1-3 in the second and third embodiments are optional; the wireless device could request an authentication message from a service provider via an access point it has found by normal scanning of available radio networks.

It is further not necessary that the login credential for a network provider is sent to the wireless device by the information server. The login credentials could instead be stored in the wireless device and submitted to the network provider once the information server has authenticated the access point, hence steps 7-8 could be replaced by a step where the information server only sends a message to the wireless device that the access point is verified.

In the above examples a MAC address is used as the identifier for each of the access point and the wireless device. It is to be understood that the MAC addresses of the device and/or the AP could be the MAC addresses of their wireless network interface cards. The identifier could, however, be a hardware ID for both the AP and the wireless device or any other identifier that is unique to the device or to a user, such as a telephone number or SIM ID. In this case, the association request could still be used for sending the request for the authentication message to the network provider; however, the ID would have to be added to the request.

When using the association request from the device to the AP as a request for an authentication message, the AP wouldn't know if the device wants just to connect or is requesting the authentication message. There are however two ways of viewing this:

The AP always treats any association request as a request for an authentication message, and then sends the message in the association response, which will be ignored in a device that has not been configured to use the authentication message, but will be understood by any device that has been programmed to understand it, that is any device that has signed on to use the authentication service.

Instead of using the association request as it is, a special add-on could be put in to mark that the authentication message is requested.

This is just one way to ask for the authentication message. As an alternative a proprietary packet could be used to request the authentication message.

All embodiments above are implemented in an IEEE 802.21 network, however, they could be also be implemented in networks operating in accordance with other standards as long as a similar information service is offered. For example in 3GPP (3rd Generation Partnership Project) a similar information service called Access Network Discovery and Selection Function (ANDSF) is implemented in order to assist wireless devices to discover available networks and their capabilities.

In addition to verifying that an access point is genuine and not a rogue or malicious access point the information server can also inform the wireless device of a security level for the selected access point. The security level will be stored in the MIIS, or information server, as an information element of that AP and the level of security will depend on the access point service provider security; if the information over the air is encrypted; and the type of encryption used. All the information elements stored in the MIIS will be available to users and/or service providers.

The security level determines what types of services a user should or should not access via the access point, for example:

Level 0: A default security level that allows a user to use the AP for normal Internet browsing. The user should only access Web pages that don't require user login and authentication.

Level 1: The user can access transaction-less services that require user authentication, such as forums or e-mails.

Level 2: The user can access services that require transactions, such as eBay or Amazon.

Level 3: For performing e-banking.

If the user is connected to a level 0 access point and tries to connect to his/her email, the connection manager will display a message informing that the current AP is not secure enough. It will also provide the user with 3 options:

Ignore the advice and use the current AP to check the email.

Use 3G to check the email if available (this option could also be setup as default when AP security level is not considered enough for the current application).

As the connection manager knows the location of the neighbouring AP it could advise the user where to go to perform the required service/application. The direction could be "move 100 meters along the current street". So the connection manager can tell the user that "There is a suitable AP within 40 meters, would you like to get directions?"

Figure 4:
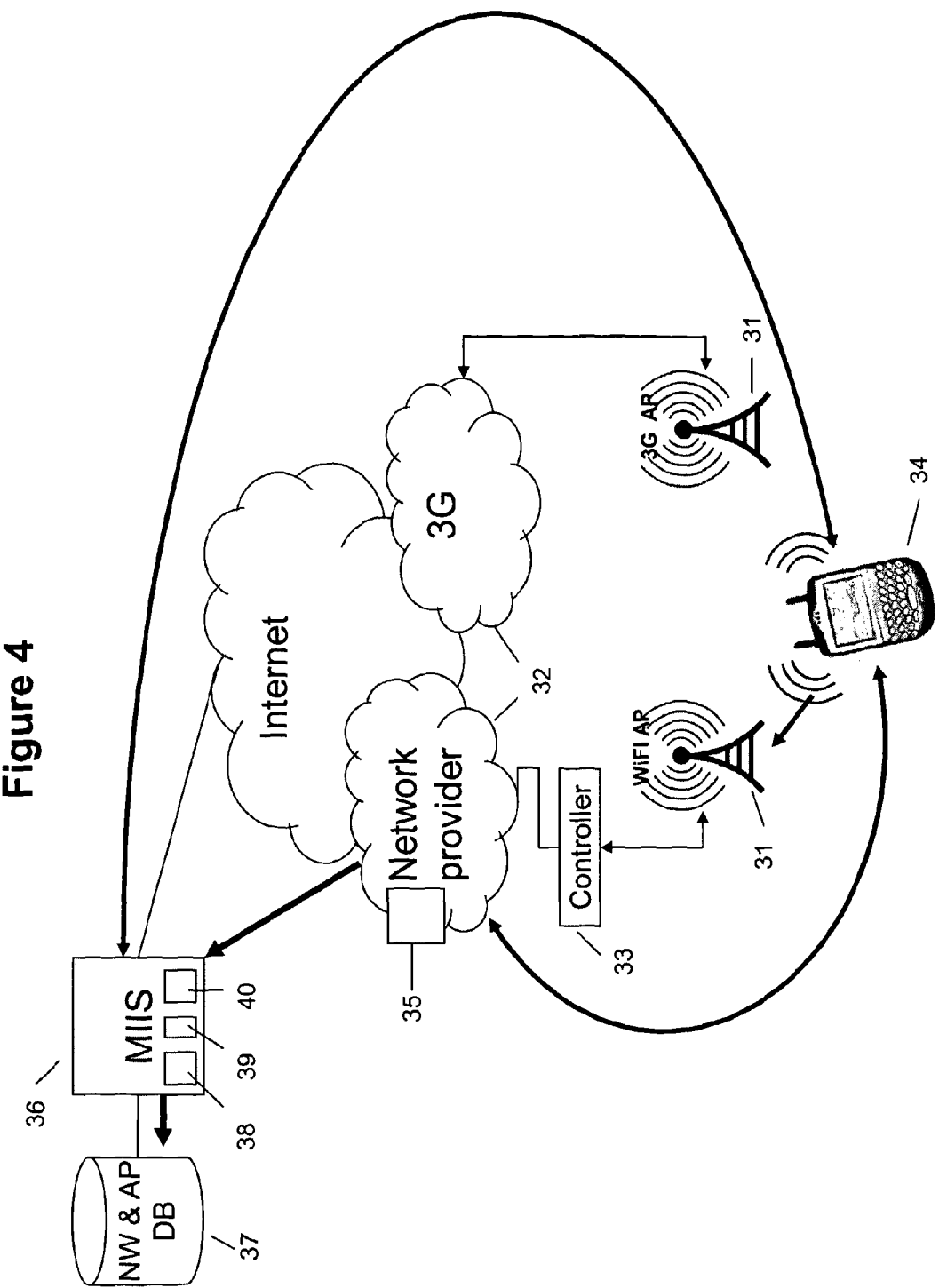
FIG. 4 shows a system for verifying a wireless connection.

A system into which the described embodiments can be implemented will now be described in relation to FIG. 4.

The system comprises a number of different access points 31 belonging to different network providers 32 with different types of networks that provide services to users. The access points can for example be WLAN access points or Bluetooth access points. Each access point 31 is connected to a controller, or network management server, 33 in the wired network. The controller 33 is designed to control all the access points in the network in a known manner as well as creating authentication messages requested by connection managers in mobile devices 34. Alternatively the authentication messages can be created by other servers 35 in the particular network. Both the controller 33 and the server 35 can be general purpose computers comprising databases and software programs designed to perform different tasks such as managing the access points in the network and creating requested authentication messages as well as encrypting or processing in other ways these authentication messages. The software required to perform the described authentication method can be stored on DVD-ROMs or other portable storage media and installed on ordinary controllers/management servers in a network belonging to a network provider that wants to implement the described authentication method service. When the installed software is running on the controller or server it will upon receiving an association request automatically create the authentication message and send it back to the requesting device in the association response. The means for creating the authentication message and the cryptographic means could also be implemented as hardware.

In order to further improve the authentication method the controller could have a further database comprising IP addresses and MAC addresses for all its access points. When the controller receives the request for an authentication message it could check that the IP address of the access point that sent the request is in the database and also retrieve the corresponding MAC address for the access point and check that it is the same as the AP MAC address received with the request.

The system further comprises an information server, or MIIS, 36. The information server comprises a database 37 that holds information about networks and access points. Some examples of what this information could be are: operator name, cost per minute, cost per hour, bandwidth, access point MAC address, channel and location of the access point. Each of these fields is called an Information Element (IE) and the standard defines some of them but allows the use of extended ones.

The information server has a Global IP address, and the wireless device can use any of its network interfaces to connect to the information server over the Internet in order to obtain the required information. Preferably, there will be a number of information servers belonging to different groups of interoperable wireless networks, each server covering a different geographical area.

The information server further comprises cryptographic software or hardware 38 for decrypting an authentication message received from a wireless device and a verification unit or comparator 39, either implemented as a software module or hardware module, which is programmed or designed to compare the derived access point ID and device MAC address, or any other ID associated with the device or user, from the authentication message to access point IDs stored in the database 37 and the MAC address of the wireless device stored in a data base 40 in the information server. The database 40 relates an identifier of the wireless device which is retrievable from a 3G or GSM connection to the MAC address of the device.

The software required to perform the described verification method can be stored on DVD-ROMs or other portable storage media and be installed on the information server and when running on this server performing said authentication method.

In order to enable a mobile device to use the verification method the device needs to have a software program installed, preferably in the connection manager, which recognises that the association response from the network provider comprises an authentication message and extracts the authentication message from the association response and forwards it to an information server. This software program can for example be downloaded directly to the device from an Internet site provided by the network provider or the software program could be stored on a DVD-ROM or other portable storage media and installed on the device via a computer into which the DVD-ROM or other storage media is inserted and run.

In summary, rogue or malicious access points pose a threat to wireless networks and the users of these networks. In order to prevent or reduce this threat a method and system is proposed that verifies that an access point is genuine and not rogue before setting up a connection between the access point and a wireless device.

The authentication is based on comparing an identifier of the wireless device obtained from an authentication server in the wired network to an identifier of a wireless device obtained directly from the wireless device. A comparator in an information server receives the two sets of data and compares the two identifiers and if they match the access point is verified as genuine.

The invention claimed is:

1. A method of detecting the intervention of a rogue point of access in a communication between a wireless device and a wired network reachable via a genuine point of access, said method comprising:
generating, by said wired network, an encrypted authentication message comprising data indicative of an identifier of said wireless device, wherein said identifier was presented to said wired network by said wireless device through said communication, and sending the encrypted authentication message to the wireless device;
providing to a comparator, by said wireless device, over a previously authenticated wireless network, data indicative of the identifier of the wireless device and the encrypted authentication message;
decrypting, by said comparator, the authentication message, and comparing the two sets of data indicative of the identifier of the wireless device;
detecting intervention of a rogue point of access in a communication between said wireless device and the wired network if said two sets of data do not match; and
signaling the result of said comparison to said wireless device over said previously authenticated wireless network;
wherein the wired network is configured to further include in the encrypted authentication message data indicative of an identifier of the point of access used in the communication between the wireless device and the wired network and wherein the comparator is further configured to compare the data indicative of an identifier of the point of access to identifiers of known points of access previously stored at the comparator.

2. A method according to claim 1 wherein the identifier of the wireless device is an identifier of the device's wireless network interface.

3. A method according to claim 2 wherein said comparator is accessible to said wireless device via a second wireless interface of said wireless device, and said wireless device sends data indicative of its first wireless interface identifier and the authentication message to said comparator via the second wireless interface.

4. A method according to claim 3 wherein the comparator comprises a database which relates the first wireless interface identifier for each registered wireless device to another identifier of the wireless device, the comparator further being configured to determine said other identifier from information submitted by the device via said second wireless interface.

5. A method according to claim 3 wherein the comparator is co-located with an information server, which supports handover of said wireless device between wireless heterogeneous networks.

6. A method according to claim 1 wherein the data indicative of the identifier is processed in the wired network on behalf of a plurality of genuine access points by a central processor.

7. A method according to claim 1 wherein the comparator is configured to send log-in credential to the wireless device upon determining that the two compared sets of data indicative of the identifier match.

8. A system for detecting the intervention of a rogue point of access in a communication between a wireless device and a wired network reachable via a genuine point of access, said system comprising:
a comparator;
a server in said wired network arranged to generate an encrypted authentication message comprising data indicative of an identifier of the wireless device, wherein said identifier was presented to said wired network by said wireless device through said communication, and to send the encrypted authentication message to the wireless device;

a connection manager in said wireless device arranged to provide to a comparator, over a previously authenticated wireless network, data indicative of the identifier of the wireless device and the encrypted authentication message;

the comparator arranged in operation to decrypt the authentication message and to compare the two sets of data indicative of the identifier of the wireless device to determine if they match, and if not, to detect intervention of a rogue point of access in the communication between said wireless device and the wired network; and a transmitter configured to signal the result of said comparison to said wireless device over said previously authenticated wireless network;

wherein the wired network is configured to further include in the encrypted authentication message data indicative of an identifier of the point of access used in the communication between the wireless device and the wired network and wherein the comparator is further configured to compare the data indicative of an identifier of the point of access to identifiers of known points of access previously stored at the comparator.

9. A system according to claim 8 wherein the identifier of the wireless device is an identifier of the device's wireless network interface.

10. A system according to claim 8 wherein the comparator is co-located with an information server, which supports handover of said wireless device between wireless heterogeneous networks.

11. A system according to claim 10 wherein the comparator comprises a database which relates the wireless interface identifier of each registered wireless device to another identifier of the wireless device, where the comparator is further arranged to determine said other identifier from information submitted by the wireless device over a second wireless interface.

12. A wireless device comprising a plurality of wireless network interfaces, and a processor configured to perform a method comprising:
initiating a communication between the wireless device and a wired network reachable via a genuine point of access;

receiving from the wired network an encrypted authentication message comprising data indicative of an identifier of said wireless device, wherein said identifier was presented to said wired network by said wireless device through said communication, and data indicative of an identifier of the point of access used in communication between the wireless device and the wired network;

providing to a comparator, over a previously authenticated wireless network, data indicative of the identifier of the wireless device and the encrypted authentication message; and receiving from said comparator, over said previously authenticated wireless network, the result of a comparison of the two sets of data indicative of the identifier of the wireless device and a comparison of the data indicative of the identifier of the point of access to identifiers of known points of access previously stored at the comparator;

and if said two sets of data do not match and/or the point of access is not a known point of access, detecting, based on the comparison result from said comparator, intervention of a rogue point of access in a communication between said wireless device and the wired network.

13. An authentication server comprising a processor, a memory and a non-transitory storage medium containing instructions, when executed by the processor to perform a method comprising:

generating, for use by a comparator in the wired network which comparator detects intervention of a rogue point of access in a communication between a wireless device and a genuine point of access, an encrypted authentication message comprising data indicative of an identifier of a wireless device, wherein said identifier was presented to said wired network by said wireless device through communication with a point of access in the wired network, and data indicative of an identifier of said point of access used in the communication between the wireless device and the wired network;

and sending the encrypted authentication message to the wireless device via said point of access, which wireless device is configured to provide said authentication message to the comparator in the wired network, which comparator decrypts and compares the data received in the authentication message with a received identifier of the wireless device and a list of stored identifiers of points of access in order to detect intervention of a rogue point of access.

14. A comparator comprising:

an interface configured to receive from a wireless device, over a previously authenticated wireless network, data indicative of an identifier of the wireless device seeking to authenticate a point of access and an encrypted authentication message generated by a wired network, said message comprising data indicative of the identifier used by a wireless device in communication with the wired network via a point of access which provides wireless access to the wired network, wherein said identifier was presented to said wired network by said wireless device through a communication between said wireless device and said wired network reachable via a genuine point of access; and a processor configured to decrypt the authentication message and to compare the two sets data indicative of the identifier of the wireless device and to detect intervention of a rogue point of access in a communications between said wireless device and the wired network if said two sets of data do not match so that the result of the comparison can be provided to said wireless device over said previously authenticated wireless network, wherein the wired network is configured to further include in the encrypted authentication message data indicative of an identifier of the point of access used in the communication between the wireless device and the wired network and wherein the comparator is further configured to compare the data indicative of an identifier of the point of access to identifiers of known points of access previously stored at the comparator.

* * * * *